Nov. 8, 1960 W. D. LAVELLE 2,959,429
FIFTH WHEEL SAFETY DEVICE
Filed Aug. 24, 1959 2 Sheets-Sheet 1

INVENTOR.
WILLIAM D. LAVELLE
BY
Beau, Brooks, Buckley & Beau
ATTORNEYS

Nov. 8, 1960  W. D. LAVELLE  2,959,429
FIFTH WHEEL SAFETY DEVICE
Filed Aug. 24, 1959  2 Sheets-Sheet 2

INVENTOR.
WILLIAM D. LAVELLE
BY
Bean, Brooks, Buckley & Bean
ATTORNEYS

2,959,429
FIFTH WHEEL SAFETY DEVICE
William D. Lavelle, 82 Brayton St., Buffalo, N.Y.

Filed Aug. 24, 1959, Ser. No. 835,465

4 Claims. (Cl. 280—432)

My invention relates in general to fifth wheel safety devices for tractor-trailer combinations, and in particular to a device of this nature which shall reinforce and strengthen the king pin thereof.

The principal object of my invention is to provide oppositely disposed safety devices for distributing the load between the coupling device of the tractor and the trailer.

A further object is to provide a coupling device having abutment rams actuated to operated positions by air pressure.

A further object is to provide arcuate channel members carried by the trailer for automatic engagement by said rams when the braking system of the tractor is coupled to the trailer.

Another object is to provide abutment means at the ends of said channels for engagement with the abutment rams for limiting relative turning movement between the tractor and the trailer.

Another object is to provide a structure having arcuate channels which are substantially concentric with the king pin, whereby the engaged rams of my device aid in the steering movement of the vehicle.

Moreover, the abutment rams are preferably located in a vertical plane which is at an angle of substantially 45° or less to the longitudinal axis of the coupled tractor and trailer, whereby the load thrust between the tractor and trailer will be taken substantially uniformly by the abutment rams and the king pin.

Moreover, means are provided for retaining the abutment rams in engagement with the channels after the brake hose coupling has been disconnected, thereby making it convenient for the operator to manually release these rams before the king pin can be disengaged and the trailer disconnected.

Furthermore, my device is so simple that it may be easily installed on present tractor-trailer equipment without redesign.

The above objects and advantages have been accomplished by the device shown in the accompanying drawings, of which:

Fig. 3 is an enlarged fragmentary view of one of the abutment rams and is taken on line III—III of Fig. 2.

Figure 1:
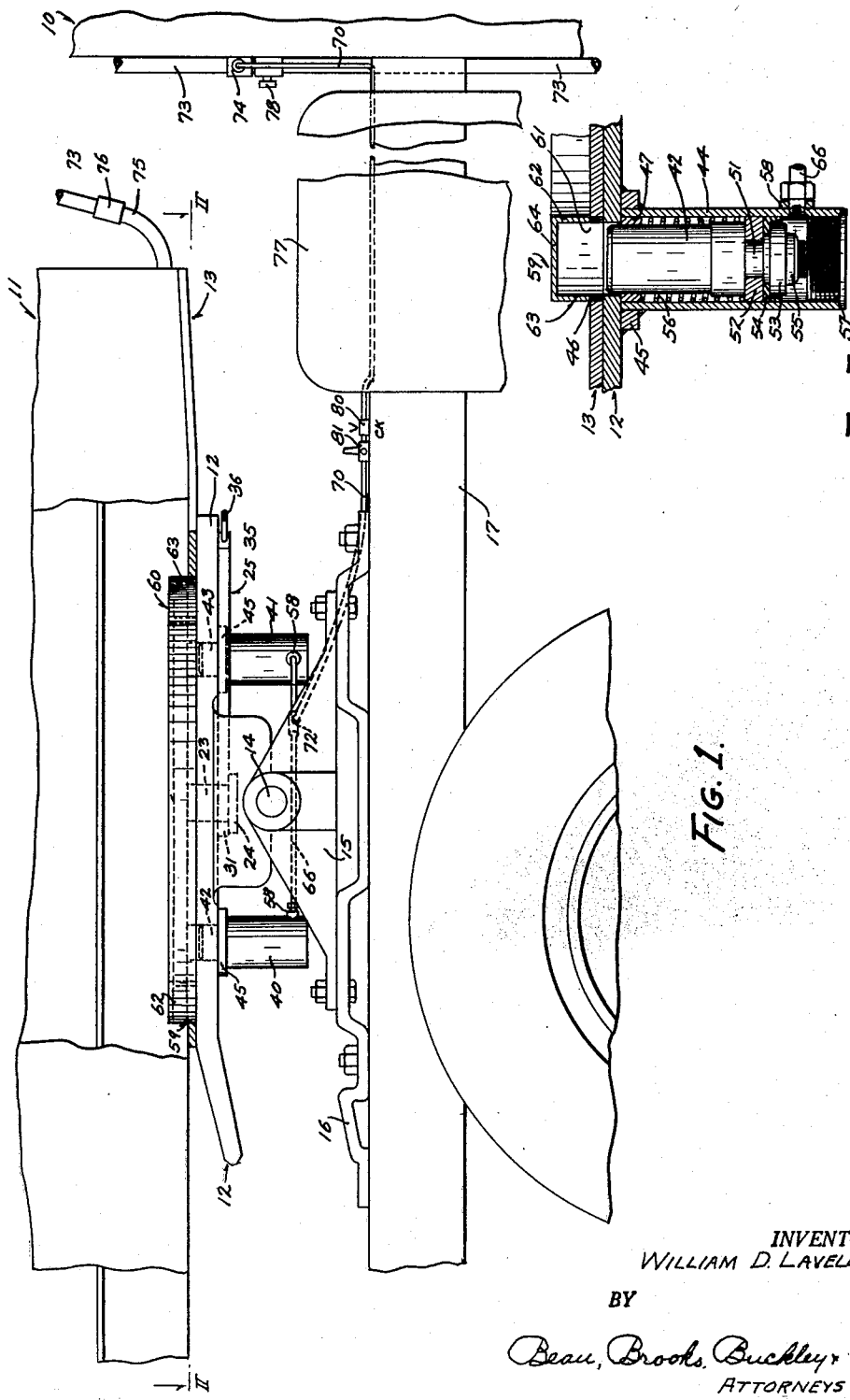
Fig. 1 is a side elevation of my device.
Figure 2:
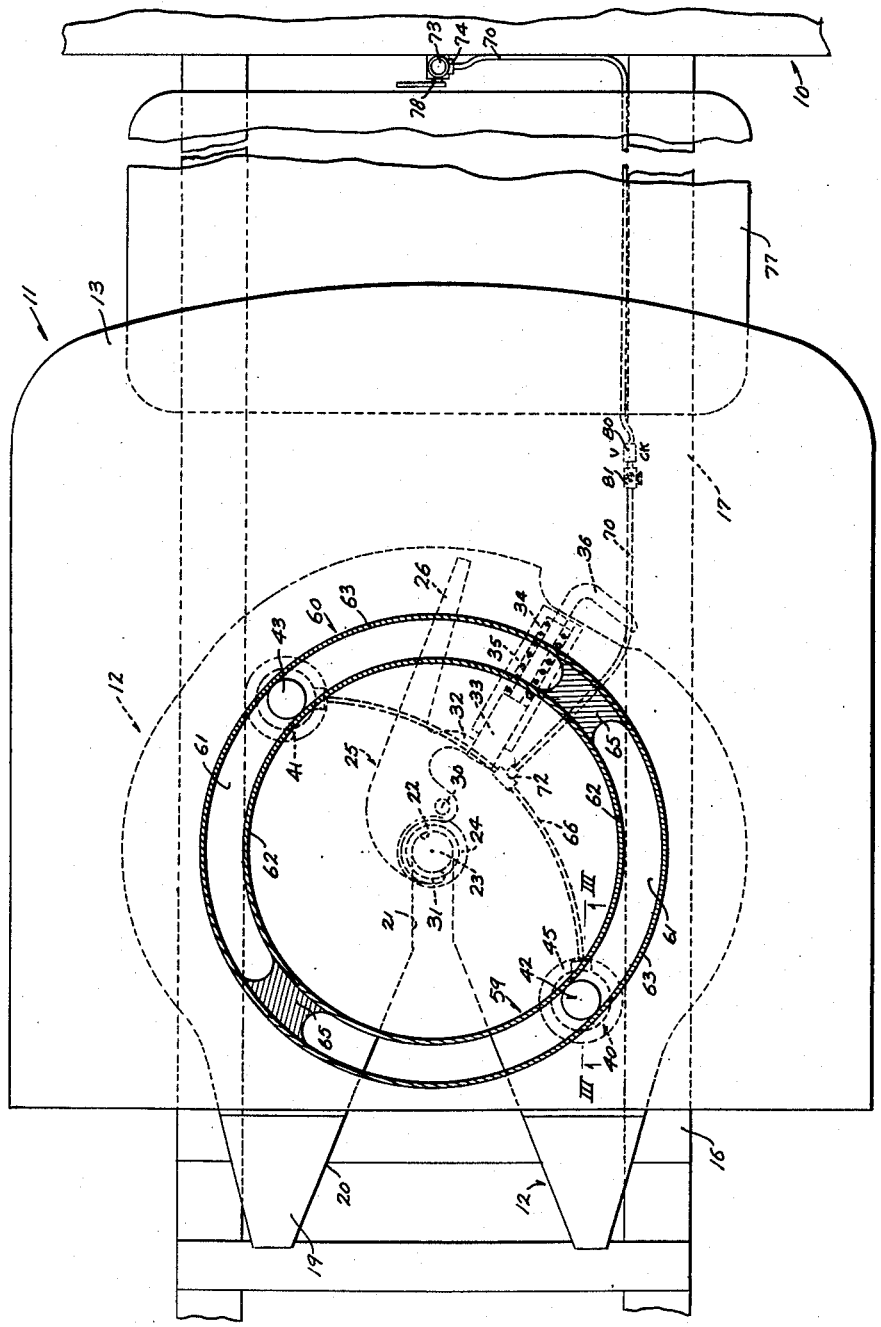
Fig. 2 is a sectional plan view taken on line II—II of Fig. 1.

My invention is designed to be used on the regular standard tractor-trailer combination having a tractor 10 and a trailer 11. The tractor is provided with the usual fifth wheel 12 and the trailer with the cooperating wear plate 13. As is customary, the fifth wheel is tiltably mounted upon pivot pins 14 carried by supports 15. These supports are mounted upon a bolster plate 16 which is secured to the tractor chassis 17. The fifth wheel is provided with the usual guide portion 19 formed with angularly arranged guide surfaces 20 leading into the forwardly extending slot 21 and terminating in a semicircular abutment surface 22. The trailer carries the usual king pin 23 for engagement with the slot 21 and surface 22, and the king pin is formed with a retaining collar 24 for engagement with the coupling lock mechanism 25. This lock mechanism may comprise the usual lever 26 pivotally attached to the fifth wheel at 30 and provided with an arcuate portion 31 for encircling the king pin. The lever 26 may be provided with a lug 32 for engagement with the lever stopping plunger 33 which is slidably carried by a housing 34 and is spring pressed outwardly of the housing by means of a compressed spring 35. The plunger may be actuated against the compression of the spring 35 by means of a handle 36 carried by the plunger when the coupling mechanism is to be disconnected from the king pin.

My invention comprises two oppositely arranged stop devices 40 and 41 which are carried by the fifth wheel of the tractor and are secured to the bottom surface of said fifth wheel. As shown in Fig. 3, reciprocating abutment rams 42 and 43 are slidably carried by the devices 40 and 41, respectively, and each ram is slidably mounted within a cylinder 44. Each cylinder is provided with an attachment flange 45 secured, as by welding, to the under side of the fifth wheel. The fifth wheel is formed with suitable openings 46 for the free movement of the abutment ram therethrough. A ram bearing 47 is secured in the upper end of the cylinder and it slidably supports the upper end of the ram, a slightly increased diametrical ram portion 50 being provided to form a stop for limiting the upward movement of said rams. Each of the rams is formed with a reduced diametrical portion 51 upon which is mounted a piston 52 and a piston washer 53 held in place by a nut 55 screw-threaded upon said portion. A flexible packing 54 is held against the lower surface of the piston and between it and the washer. A compression spring 56 is mounted in the cylinder, having one end pressing against the bearing 46 and the other end against the piston 52. A cylinder head 57 is screw-threaded into the lower end of the cylinder, which serves to close the cylinder and to act as a stop for the downward travel of the ram. The screw-threaded heads make it possible to conveniently service the stop devices. An air connection 58 is attached to the cylinder for the passage of air into the ram cylinder, as hereinafter described.

Secured to the under side of the trailer are two arcuate channel members 59 and 60 forming open guides facing downwardly toward registering circular slots 61 formed in the wear plate 13. The channels are preferably secured by weldment disposed in the slots 61. These channels have inner and outer side walls 62 and 63, respectively, and tops 64, and are semicircular in shape thus forming a complete circle concentric with the king pin. An abutment block 65 is disposed in the channels at the ends thereof and is securely fastened thereto, as by welding. The abutment blocks are preferably arranged to lie in a vertical plane at an angle of substantially 45° or less to the vehicle longitudinal center line, and they are so located in relation to abutment rams that the rams will be medially located therein.

The safety devices 40 and 41 are connected together by means of a flexible air tube 66, and an air tube 70 is connected to said tube 66 by means of a T-fitting 72. The tube 70 is connected directly to the main air brake hose 73 of the tractor through a T-connection 74 located immediately above the valve 78 in the brake hose 73. The tube 70 preferably extends along and is secured to one of the structural members of the tractor chassis 17 underneath the fuel tank 77. The main air line hose 73 is connected to the trailer brake hose 75 by means of a coupling 76. The arrangement of the main air line hose 73 and the T-fitting 74 is, therefore, such that upon opening of the valve 78 to the trailer hose 73, air will be automatically supplied to the abutment rams 42 and 43 thus forcing the abutment rams 42 and 43 up into the associated arcuate channels 59 and 60 and between the guiding walls 62 and 63 thereof. The rams are, therefore, always engaged with the associated channels while the air is under pressure in the trailer brake system and the rams are actuated wholly independently of the actuation of the vehicle brake pedal, whereby the operator can always be assured that the rams are engaged when the trailer brake system is under pressure. A further factor of safety of my invention includes a check valve 80 connected in the tube 66 so that in the event of pressure failure from any source the pressure within the cylinders of the safety devices will be maintained, thus keeping the abutment rams up into engagement with arcuate channels and thereby maintaining the safety offered by my invention. A further advantage of maintaining the operative position of the rams while the brake system of the vehicle is disconnected is that the operator cannot absent-mindedly release the trailer without dropping the supporting wheels for the reason that the rams will be held in engagement with the channels until they are manually released by an air release valve 81 located in the tube 66 between the check valve 80 and the safety devices 40 and 41.

As hereinbefore stated the safety devices are located in a vertical plane disposed at an angle of substantially 45° or less to the longitudinal axis of the vehicle and because of this arrangement the rams of the safety devices will abut against the vertical walls 62 and 63 of the arcuate channels and will therefore distribute the load taken by the king pin. This is true whether the tractor is pulling the trailer or when the trailer has its brake applied. For instance, when the tractor is moving forwardly the rams 43 and 42 will abut against the outer and inner walls 63 and 62, respectively, of the arcuate channels 59 and 60, respectively, when the load is being drawn; and the rams 42 and 43, respectively, will abut against the outer wall 63 and the inner wall 62, respectively, of the arcuate channels 59 and 60, respectively, when the trailer brakes are applied.

From the foregoing, it will be obvious that when turning the tractor, as in parking or under jackknifing conditions, the rams will engage the abutment blocks 65 at the ends of the arcuate channels thus limiting relative turning of the vehicle parts and preventing damage to the trailer or tractor. Furthermore, these limiting blocks avoids tipping of either tractor or trailer under adverse steering conditions. In the event of partial tipping of the tractor or trailer, under jackknifing conditions, the outside pin will take substantially all of the thrust and thereby maintain connection with the parts of the vehicle.

It will be obvious from the foregoing that air will be automatically supplied to the ram cylinders the instant that the air valve 78 supplying air to the trailer is opened, thus the operator can be assured that the rams will be in engagement with the arcuate channels without further thought. Furthermore, the rams having once been elevated, will remain elevated after the valve controlling the air supply has been shut off owing to the check valve in the tube 66. The operator can then release the air pressure in the safety device at a position within reach of the coupling lock mechanism 25, thus making sure that the trailer is in condition to be disconnected.

Having fully disclosed and completely described my invention, and its mode of operation, what I claim as new is:

1. The combination with the coupling device of a tractor-trailer having a fifth wheel, a king pin, and a source of air supply for the brakes of the vehicle, of two arcuate channels carried by the underside of the trailer and having guideways concentric with said king pin, two oppositely arranged stop devices mounted upon said fifth wheel and having abutment rams engageable with the guideways of said channels, stop means carried by the trailer at the ends of said channels for limiting the relative turning movement between the tractor and the trailer, and means for bringing said stop devices into communication with said air supply immediately upon initial connection of said source of air supply with the trailer for moving said rams to their full operative positions within said channels and for maintaining them in engagement therewith.

2. The combination with the coupling device of a tractor-trailer having a fifth wheel, a king pin, and a source of air supply for the brakes of the vehicle, of two arcuate channels carried by the underside of the trailer and having guideways concentric with said king pin, two oppositely arranged stop devices mounted upon said fifth wheel and having abutment rams engageable with the guideways of said channels, stop means carried by the trailer at the ends of said channels for limiting the relative turning movement between the tractor and the trailer, said stop devices having their axes in alignment with each other and with the axis of said king pin and passing through a vertical plane located at an angle of substantially 45° or less to the longitudinal axis of the vehicle, and means for bringing said stop devices into communication with said air supply immediately upon initial connection of said source of air supply with the trailer for moving said rams to their full operative positions within said channels and for maintaining them in engagement therewith.

3. The combination with the coupling device of a tractor-trailer having a fifth wheel, a king pin, and a source of air supply for the brakes of the vehicle, of two arcuate channels carried by the underside of the trailer and having guideways concentric with said king pin, two oppositely arranged stop devices mounted upon said fifth wheel and having abutment rams engageable with the guideways of said channels, said abutment rams being of round cross-section and so proportioned with respect to the guideways of the cooperating channels that they will simultaneously engage with the respective abutments formed by the guideways, stop means carried by the trailer at the ends of said channels for limiting the relative turning movement between the tractor and the trailer, and means for bringing said stop devices into communication with said air supply immediately upon initial connection of said source of air supply with the trailer for moving said rams to their full operative positions within said channels and for maintaining them in engagement therewith.

4. The combination with the coupling device of a tractor-trailer having a fifth wheel, a king pin, and a source of air supply for the brakes of the vehicle, of two arcuate channels carried by the underside of the trailer and having guideways concentric with said king pin, two oppositely arranged stop devices mounted upon said fifth wheel and having abutment rams engageable with the guideways of said channels, said abutment rams being of round cross-section and so proportioned with respect to the guideways of the cooperating channels that they will simultaneously engage with the respective abutments formed by the guideways, stop means carried by the trailer at the ends of said channels for limiting the relative turning movement between the tractor and the trailer, said stop devices having their axes in alignment with each other and with the axis of said king pin and passing through a vertical plane located at an angle of substantially 45° or less to the axis of the vehicle, and means for bringing said stop devices into communication with said air supply immediately upon initial connection of said source of air supply with the trailer for moving said rams to their full operative positions within said channels and for maintaining them in engagement therewith.

References Cited in the file of this patent

UNITED STATES PATENTS

| | | |
|---|---|---|
| 2,119,460 | Gurton et al. | May 31, 1938 |
| 2,126,819 | Schawlem | Aug. 16, 1938 |
| 2,400,738 | Brown | May 21, 1946 |
| 2,462,211 | Moore | Feb. 22, 1949 |
| 2,673,747 | Norris | Mar. 30, 1954 |

FOREIGN PATENTS

| | | |
|---|---|---|
| 1,100,950 | France | Apr. 3, 1955 |